United States Patent Office 3,344,199
Patented Sept. 26, 1967

3,344,199
PROCESS FOR FORMING CYCLODODECATRIENE
Joseph Eli Brenner, Vesenaz, Switzerland, assignor to E. I. du Pont de Nemours and Company, Wilmington, Del., a corporation of Delaware
No Drawing. Filed Sept. 21, 1966, Ser. No. 580,886
5 Claims. (Cl. 260—666)

ABSTRACT OF THE DISCLOSURE

A process for the trimerization of butadiene to cyclododecatriene at 60 to 90° C. using an aluminum sesquichloride and titanium compound e.g., titanium tetrachloride wherein selected alcohols e.g., 2-methyl-2-propanol and 2-ethyl-2-butanol are employed to increase the reaction rate and yield.

This application is a continuation-in-part of copending application Serial No. 481,953, filed August 23, 1965 by Joseph Eli Brenner.

The present invention relates to a process for the trimerization of butadiene to cyclododecatriene-(1,5,9) using a catalyst prepared from an organoaluminum sesquichloride, a selected alcohol and a selected tetravalent titanium compound.

The production of cyclododecatriene-(1,5,9) by subjecting butadiene to the action of various catalysts is known. Butadiene trimerization catalysts, based on alkylaluminum chlorides and titanium halides, such as those described in Schneider et al., U.S. Patent No. 3,076,045, and Wilke, U.S. Patent No. 2,964,574 are known.

The present invention is an improvement in rate of reaction and in ultimate yield over these above-mentioned prior processes involving the use of a certain catalyst system under certain reaction conditions.

The preferred catalyst system is prepared from the hereinafter defined aluminum sesquichlorides, 2-methyl-2-propanol or triphenyl methanol and titanium tetrachloride. Catalyst components are preferably limited to these three. For convenience, the exact composition of the organometallic compound may be varied and described as any composition having the following ratio of materials:

wherein Z is selected from the class consisting of alkyl radicals containing from 2 to 4 carbon atoms and the phenyl radical. The molar ratio of the organoaluminum sesquichloride to the alcohol should be maintained at from about 1/0.3 to about 1/1.1 when these compounds are prereacted prior to introduction into the reaction zone and at from about 1/.5 to about 1/2.0 when the compounds are added as separate streams into the reaction zone.

The molar ratio of the organoaluminum sesquichloride to the titanium compound is not so critical and can be varied from 3/1 to 30/1. Higher ratios can be used but are not desirable because of the expense of the organoaluminum sesquichloride.

The catalyst components can be added separately to the reaction medium or premixed prior to introduction into the reactor. An alternative procedure involves reacting the alcohol with organoaluminum sesquichloride and heating the reactant. The product formed during the heating period is then reacted with the titanium compound. For example, ethylaluminum sesquichloride can be reacted with tertiarybutyl alcohol below about 50° C., and thereafter heated at a temperature in the range 80 to 135° C.

Alcohols which are operable in the present process include those alcohols having the formula

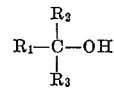

wherein $R_1$, $R_2$ and $R_3$ are alkyl groups of 1 to 10 carbon atoms, and aryl and substituted aryl groups having 6 to 12 carbon atoms, and wherein $R_1$, $R_2$ and $R_3$ are alkyl groups, at least one of the R groups contains at least one hydrogen atom on the carbon atom attached to the carbon atom attached to the hydroxyl group. Phenyl is the preferred aryl group. Examples of alcohols embraced by the above formula are:

2-methyl-2-propanol
2-methyl-2-dodecanol
2-decyl-2-dodecanol
11-decyl-11-heneicosanol
2-ethyl-2-butanol
2-methyl-2-hexanol
triphenyl methyl alcohol
1,1-diphenyl-1-pentanol
1-(p-hexylphenyl)-1-methyl-1-butanol
11-phenyl-11-heneicosanol
1-phenyl-1-butyl-1-butanol.

Any tetravalent titanium compound is operable in the present process provided it is soluble in the reaction medium to the extent of at least 0.01 mole percent based on cyclododecatriene-(1,5,9) at 20° C. and which compound does not contain a substituent which inactivates the catalyst. The titanium compounds have the formula $TiA_4$ wherein A is selected from the class consisting of chlorine, bromine, iodine and OR, wherein R is a hydrocarbon radical having from 1 to 20 carbon atoms. The four A's in a given titanium compound may be the same or different.

The butadiene trimerization reaction can be run in any inert hydrocarbon solvent such as benzene, cyclohexane, toluene, xylene or hexane. Optionally a catalyst solvent can be employed to facilitate the addition of catalyst and intimate contact with the reactants.

Cyclododecatriene is an excellent solvent and is preferred for continuous trimerization of butadiene.

The butadiene trimerization reaction temperature should be maintained at from 20 to 120° C., and preferably from 60 to 90° C. At lower temperatures, the reaction rates become unduly slow and at higher temperatures increasing yield losses to by-products occur.

Pressure is not a critical variable in the instant invention and can be varied from ½ atm. to 50 atm., preferably at from 1 to 5 atm.

By operating within the hereinabove set forth limits, butadiene trimer is formed substantially above the rates obtained in the absence of the alcohol and in yields above yields above 85 percent.

The reaction can be conducted in multiple stages.

The following examples are presented to illustrate but not to restrict the present invention.

Examples 1–9

To a solution containing 24.75 grams of $Et_3Al_2Cl_3$ (100 mmoles) and 60 ml. of toluene was added a solution containing 3.78 grams (51 mmoles) of tert.-butyl alcohol and 50 ml. of toluene at the rate of 0.6 ml./minute with rapid stirring. After the addition was completed, the resultant solution was heated to about 80° C. for 50 minutes and thereafter cooled to room temperature. This solution of the organometallic reaction product was then added to the reactor as described hereinbelow.

The apparatus employed for the trimerization consisted of a 2-liter 3-necked, creased, round-bottomed flask fitted with rubber stopper, condenser with an outlet to a mercury bubbler, thermometer, high speed stirrer, and gas inlet. After the apparatus was well dried and flushed with inert gas, 150 ml. of benzene which had been dried and rendered oxygen-free by distillation from a sodium-potassium alloy under nitrogen were added to the flask. The benzene was heated to 55° C.±5° C. and the solution of organometallic, prepared as described, calculated as equivalents of reducing power of ethylaluminum groups was injected with moderate agitation followed by titanium tetrachloride in the amount indicated in the following table as a 0.1M solution in benzene. The rate of stirring was then increased to 2,000 r.p.m. Butadiene, purified by stirring with, and distillation from, triisobutyl aluminum was passed into the reactor slightly more rapidly than it is adsorbed to maintain a purge of a few cc./min. through the trap. The reaction temperature was maintained at 70° C.±2° C. After the time shown in the table, the catalyst is deactivated with 10 milliliters of a 1:1 mixture of acetone and isopropyl alcohol and a sample of the crude reaction mixture analyzed immediately by gas chromatography. The average rate of the reaction throughout a run is given as the number of grams per minute (g./min.) of pure cyclododecatriene actually produced. Example 9 illustrates the poor rate and yield obtained in the absence of the alcohol.

Examples 10–14

A 500 cc. reaction vessel is equipped with inlets for continuous introduction of the solution of the organometallic reaction mixture, titanium tetrachloride and dry butadiene. Liquid product is continuously removed such that steady state conditions prevail. The effect of variation of ethylaluminum sesquichloride/titanium tetrachloride/alcohol ratios on rates and yields are reported in Table II. In each example, the organometallic and the alcohol were prereacted in a solvent according to the procedure of paragraph 1 of Examples 1–9 by heating (80° C. for Example 10 and 110° C. for Examples 11–14). Cyclododecatriene was employed as the solvent in Examples 10, 11 and 14 and toluene was employed as the solvent in Examples 12 and 13. The reactor was filled with dry solvent and sufficient catalyst for approximately one hour of operation. Butadiene was thereafter introduced in an amount sufficient to maintain the indicated pressure and catalyst was introduced in the amounts indicated. All inlet streams were at room temperature.

TABLE II

| Examples | 10 | 11 | 12 | 13 | 14 |
|---|---|---|---|---|---|
| Catalyst ratio (moles $Et_3Al_2Cl_3$/$TiCl_4$/alcohol) | 10:1:4.5 | 10:1:4.4 | 10:1:4.8 | 10:1:6 | 10:1:6 |
| Steady state productivity (lbs. crude/gal. of crude in the reactor/hr.) | 6.87 | 5.64 | 6.54 | 5.57 | 6.27 |
| Feed rate $TiCl_4$ (gm./gal./hr.) | 1.0 | 1.0 | 1.01 | 1.01 | 1.01 |
| Concentration of organoaluminum as $Et_3Al_2Cl_3$ in solvent (percent by weight) | 21 | 14.7 | 23.5 | 14.1 | 11.9 |
| Steady state $TiCl_4$ conc. (gm. $TiCl_4$/gal.) | 1.04 | 1.25 | 1.10 | 1.29 | 1.14 |
| Temperature (° C.) | 75 | 75 | 75 | 75 | 75 |
| Pressure (p.s.i.g.) | 1 | 1 | 1 | 1 | 1 |
| Percent distribution in crude: | | | | | |
| Cyclododecatriene | 84.3 | 85.8 | 85.7 | 85.6 | 85.2 |
| Cyclooctadiene | 5.15 | 4.66 | 4.67 | 2.93 | 3.41 |
| Vinyl cyclohexene | 1.87 | 1.82 | 1.58 | 1.18 | 1.35 |
| Nonvolatile residue | 6.22 | 7.23 | 6.19 | 8.51 | 9.01 |

Examples 15–21

A 500 cc. reaction vessel (except for Example 18 in which a 1500 cc. reaction vessel is used) is equipped with inlets for the continuous introduction of catalyst and dry butadiene. The inlets are arranged to permit the introduction of the organometallic, the titanium compound and the alcohol as separate streams or to permit the premixing of the organometallic and the alcohol at room temperature prior to introduction into the reaction vessel (as indicated). As in Examples 10–14, liquid product is continuously removed such that substantially steady state conditions prevail. The runs were started by filling the reactor with dry cyclododecatriene and sufficient catalyst for approximately one hour of operation. Butadiene gas was introduced in an amount sufficient to maintain the indicated pressure in the reactor during the run. All inlet streams were at room temperature and all titanium com-

TABLE I

| Example | $Et_3Al_2Cl_3$: Alcohol Ratio | Mmoles of $Et_3Al_2Cl_3$ | Mmoles Ti | Time (Min.) | Yield, percent | Rate, g./min. |
|---|---|---|---|---|---|---|
| 1 | 1:0.66 | 20 | 0.6 | 50 | 90 | 7.8 |
| 2 | 1:0.66 | 20 | 0.5 | 53 | 88 | 9.9 |
| 3 | 1:0.44 | 21 | 1.0 | 80 | 93.5 | 9.4 |
| 4 | 1:0.50 | 20 | 1.0 | 74 | 91 | 10.2 |
| 5 | 1:0.55 | 19 | 1.0 | 68 | 86.5 | 11.6 |
| 6 | 1:0.44 | 21 | 1.0 | 59 | 92.5 | 11.7 |
| 7 | 1:0.51 | 20 | 1.0 | 73 | 91.7 | 10.3 |
| 8 | 1:0.60 | 18 | 1.0 | 60 | 87 | 10.6 |
| 9 | 1:0.0 | 18 | 1.0 | 28 | 60 | 0.1 | pounds were added as a 10% by weight solution in cyclohexane. Tertiary butyl alcohol was added as a 1.35 M solution in benzene and triphenyl methanol was added as a solution containing 10 grams of the alcohol per 100 ml. of benzene. The composition of the streams containing an alcohol and the organometallic are shown in Table III along with the experimental results.

TABLE III

| Examples | 15 | 16 | 17 | 18 | 19 | 20 | 21 |
|---|---|---|---|---|---|---|---|
| Catalyst: | | | | | | | |
| Molar ratio of $Z_3Al_2Cl_3$:Ti(A)$_4$:Alcohol | 10/1/10 | 10/1/10 | 10/1/10 | 9.9/1/5.5 | 10/1/4 [1] | 10/1/10 | 10/1/10.[1] |
| Z | $C_3H_7$—[2] | $C_6H_5$—[3] | $C_6H_5$—[3] | $C_2H_5$—[3] | $C_2H_5$ [4] | $C_2H_5$ [4] | $C_2H_5$ [4] |
| A | Br— | Isopropoxide | Br— | Cl— | Cl— | Cl— | Cl— |
| Alcohol | Tertiary butyl. | Tertiary butyl. | Tertiary butyl. | Triphenyl methyl. | Tertiary butyl. | Tertiary butyl. | Tertiary butyl. |
| Feed rate | 1.01 [5] | 1.01 [5] | 1.01 [5] | 0.99 | 1.01 | 1.01 | 1.01. |
| Reaction Conditions: | | | | | | | |
| Temperature (° C.) | 75 | 75 | 75 | 76 | 75 | 75 | 75. |
| Pressure (p.s.i.g.) | 1 | 1 | 1 | 1-1.5 | 1 | 1 | 1. |
| Steady State Productivity (Pounds of crude/gal. of crude in reactor/hour) | 4.25 | 8.10 | 8.17 | 7.51 | 6.03 | 8.37 | 5.74. |
| Product Distribution in Crude Product (Corrected for butadiene and catalyst solvent). | ([6]) | ([6]) | ([6]) | | | | |
| Cyclodecatriene | 84.9 | 85.2 | 81.7 | 87.6 | 85.0 | 86.2 | 82.9. |
| Cyclooctadiene | 3.33 | 6.38 | 8.51 | 2.25 | 3.96 | 3.16 | 5.00. |
| Vinylcyclohexane | 1.54 | 2.59 | 2.22 | 1.15 | 1.69 | 1.45 | 1.89. |
| Nonvolatile residue | 10.2 | 5.85 | 7.53 | 7.55 | 7.42 | 7.81 | 7.18. |

[1] The alcohol and the organometallic compound were premixed prior to introduction into the reactor.
[2] Added as a 20% by weight solution of n-propylaluminum sesquichloride in cyclohexane.
[3] Added as a 40% by weight solution of phenylaluminum sesquichloride in chlorobenzene.
[4] Added as a 20% by weight solution of ethylaluminum sesquichloride in cyclohexane.
[5] Expressed as equivalent grams of titanium tetrachloride per gallon per hour.
[6] Normalized.

Cyclododecatriene is a valuable chemical intermediate which can be readily oxidized to succinic acid which is useful in the production of plastics such as polyamides. It also may be hydrogenated in a known manner. Thus, cyclododecene or cyclododecane is obtained from cyclododecatriene. These hydrogenated products may, in turn, be oxidized in known manner to form the corresponding dicarboxylic acids.

I claim:

1. A process for the preparation of cyclododecatriene-(1,5,9) which comprises contacting a catalyst formed by reacting an organoaluminum compound having the formula

$$(Z)_{(2.5-3.5)}Al_2Cl_{(3.5-2.5)}$$

wherein Z is selected from the class consisting of alkyl radicals having from 2 to 4 carbon atoms and the phenyl radicals with from 0.3 to 2.0 moles of an alcohol having the formula

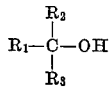

$$R_1-\underset{\underset{R_3}{|}}{\overset{\overset{R_2}{|}}{C}}-OH$$

wherein $R_1$, $R_2$ and $R_3$ are alkyl groups of 1 to 10 carbon atoms, and aryl and substituted aryl groups having 6 to 12 carbon atoms, and when $R_1$, $R_2$ and $R_3$ are alkyl groups at least one of the R groups contains at least one hydrogen atom on the carbon atom attached to the carbon atom attached to the hydroxyl group, and with a titanium compound of the formula $TiA_4$ wherein A is selected from the class consisting of chlorine, bromine, and OR, wherein R is a hydrocarbon radical having from 1 to 20 carbon atoms in an amount such that the molar ratio of the aluminum compound to titanium compound is maintained at from 3/1 to 30/1 with butadiene and conducting the reaction at from 20 to 120° C. and recovering cyclododecatriene-(1,5,9).

2. The process of claim 1 wherein the reaction is conducted in the range 60 to 90° C.

3. The process of claim 2 wherein said organoaluminum compound is ethylaluminum sesquichloride, said titanium compound is titanium tetrachloride.

4. The process of claim 3 wherein said alcohol is tertiary butyl alcohol.

5. The process of claim 3 wherein said alcohol is triphenyl methanol.

No references cited.

DELBERT E. GANTZ, *Primary Examiner.*

V. O'KEEFE, *Assistant Examiner.*